United States Patent [19]
Weiblen et al.

[11] Patent Number: 4,591,300
[45] Date of Patent: May 27, 1986

[54] DEEP-DRILLING TOOL

[75] Inventors: Richard Weiblen, Münsingen; Werner Jenny, Münsingen, both of Fed. Rep. of Germany

[73] Assignee: TBT Tiefbohrteckhik GmbH & Co. KG, Fed. Rep. of Germany

[21] Appl. No.: 460,951

[22] Filed: Jan. 25, 1983

[30] Foreign Application Priority Data

Jan. 30, 1982 [DE] Fed. Rep. of Germany ....... 3203134

[51] Int. Cl.⁴ .............................................. B23B 51/06
[52] U.S. Cl. ........................................ 408/59; 408/56; 227/27
[58] Field of Search ...................... 408/56, 57, 59, 60, 408/61, 705, 72 R, 72 B, 115, 703, 226, 241 G; 277/3, 27; 279/20; 175/207, 214, 320, 325

[56] References Cited

U.S. PATENT DOCUMENTS

| | | | |
|---|---|---|---|
| 2,708,852 | 5/1955 | Wohlfahrt | 408/59 |
| 2,741,936 | 4/1956 | Wohlfahrt | 408/59 |
| 2,977,827 | 4/1961 | Wenz | 279/20 |
| 3,317,216 | 5/1967 | Muthler | 408/56 |
| 3,320,833 | 5/1967 | Andreasson | 408/705 |
| 3,583,383 | 6/1971 | Ovshinsky | 408/56 |
| 3,637,222 | 1/1972 | Wilkinson | 277/27 |
| 4,204,689 | 5/1980 | Johansson | 277/27 |
| 4,290,611 | 9/1981 | Sedy | 277/27 |

FOREIGN PATENT DOCUMENTS

| | | | |
|---|---|---|---|
| 2461750 | 7/1976 | Fed. Rep. of Germany | 408/226 |
| 2949556 | 6/1981 | Fed. Rep. of Germany | 408/56 |
| 1063883 | 5/1954 | France | 408/56 |

*Primary Examiner*—Gil Weidenfeld
*Assistant Examiner*—Daniel W. Howell
*Attorney, Agent, or Firm*—Jones, Tullar & Cooper

[57] ABSTRACT

A deep-drilling tool, embodied by a tube provided with an internal passage and on the end of which a drill head is attached, the tube being divided into two tube sections, the rear one of which in the drilling direction has a diameter larger than that of the drill head. The entire drilling tool can accordingly be removed together with the drill head through a bearing or lubricating-oil supply device for replacement without disassembling the tool.

6 Claims, 2 Drawing Figures

DEEP-DRILLING TOOL

BACKGROUND OF THE INVENTION

The present invention relates to a deep-drilling tool including a tube provided with an internal passage or channel, and a drill head attached to one end of the tube.

Deep-drilling tools of this general type are known. When drilling begins, they are guided by a guide sleeve pressed against an end face of the workpiece to be drilled, the guide sleeve being thereby concentrically placed relative to the hole to be drilled in the workpiece. Two known methods of deep drilling are the so-called BTA-method and the single-lip drilling method. In both, the drilling tool has a passage or channel defined in its interior.

In the BTA-method, cooling of the drill head and simultaneous removal of the chips generated are effected by a soluble cutting or lubricating oil (cooling lubricant) which is pressure-fed into the hole or bore being drilled at the outside, along the circumference of the tube carrying the drill head; the lubricating oil being removed through the interior passage of the tool, carrying the chips away with it. The supply of lubricating oil is effected by a lubricating-oil supply device (hereinafter referred to as an LOSD), which includes a housing with a cylindrical interior. The lubricating oil is pressure-fed into this housing, and the LOSD is sealed off from both the bore and the drill spindle. The LOSD also serves to support the tube carrying the drill head such that the tube is spaced apart from the bore.

In the single-lip method, the lubricating oil is guided to the drill bit via the internal passage and is removed, together with the chips, along the circumference of the tube carrying the drill head, or in other words inside the space that exists between this tube and the bore.

In order to enable lubricant oil to be pressure-fed into the bore through the space between the circumference of the tube and the bore (the BTA method) or to be carried away out of the bore through that space (the single-lip drilling method), and in order to prevent the tube from pressing against the inner wall of the bore, the drill bits on the drill head have a diameter that is somewhat larger than the diameter of the tube carrying the drill head. As a result, the drill head cannot be retracted through the LOSD when the tool is to be changed. The drill head has to be unscrewed from the tube first. Only then can the tube be pulled out through the LOSD, or through the stuffing box that seals off the tube in the LOSD. In the final analysis, this means that before changing the tool at the tool spindle, the tool comprising the tube and the drill head has to be disassembled.

This is particularly disadvantageous when a fully automatic tool change is desired. To accomplish such a change the entire tool, comprising the tube and the drill head that has been screwed into place as well as an insertion cone mounted on the end of the tube, is engaged by a gripping tool and then changed. However, to do this the entire tool has to be pulled out of the LOSD, or out of the seals (stuffing box) provided in it. This could not be done with tools of the type heretofore known, because as noted above the stuffing box at the end of the LOSD is adapted to the diameter of the tube on the one hand, while on the other hand the diameter of the drill head is somewhat larger than that of the tube.

OBJECT AND SUMMARY OF THE INVENTION

It is accordingly a principal object of the present invention to provide a tool for a deep-drilling machine which can be changed without having to disassemble the tool.

This object is attained in accordance with the present invention by a deep-drilling tool of the general type discussed above in which the tube is embodied to include two tube sections, a front tube section and a rear tube section, both identified with respect to the drilling direction; the outside diameter of the front tube section being smaller than the drilling diameter of the drill head, and the drilling diameter of the drill head being smaller than the outside diameter of the rear tube section.

By this means it is possible in an astonishingly simple manner, to embody the tool such that it can be pulled out of the LOSD, in which the near tube section, that is, the tube section having the larger diameter, is seated in the seal and/or a bearing. It is thus possible to make an automatic tool change. This feature is advantageous even in non-automatic operation, because once again it becomes far simpler to change the entire tool. The rear part of the tool becomes substantially more stable because of the larger diameter of the rear tube section. There is a reduced tendency to vibration and the like. Furthermore, it is possible to embody the rear section, and thus the guide in the LOSD or in a bearing, identically for various drill heads.

This structure produces a higher sliding speed at the thicker end of the tube. An advantageous refinement of the present invention accordingly provides a seal at this point which in comparison with the stuffing-box seals previously used for this purpose is new and improved. In particular, the present invention enables a hydraulic adaptation to various tube diameters, is maintenance-free and can be used for automatic tool changers.

The drill head and the front tube section may be changed at the rear tube section. This can be effected by threaded insertion or by embodying the rear section with a collet chuck or the like. Alternatively, both tube sections may be embodied in one piece, in which case the outer diameter is merely recessed appropriately at the transition.

One exemplary embodiment of the invention and advantageous modifications thereof are described in detail below, referring to the drawings.

DESCRIPTION OF THE PREFERRED EMBODIMENT

Figures 1, 2:
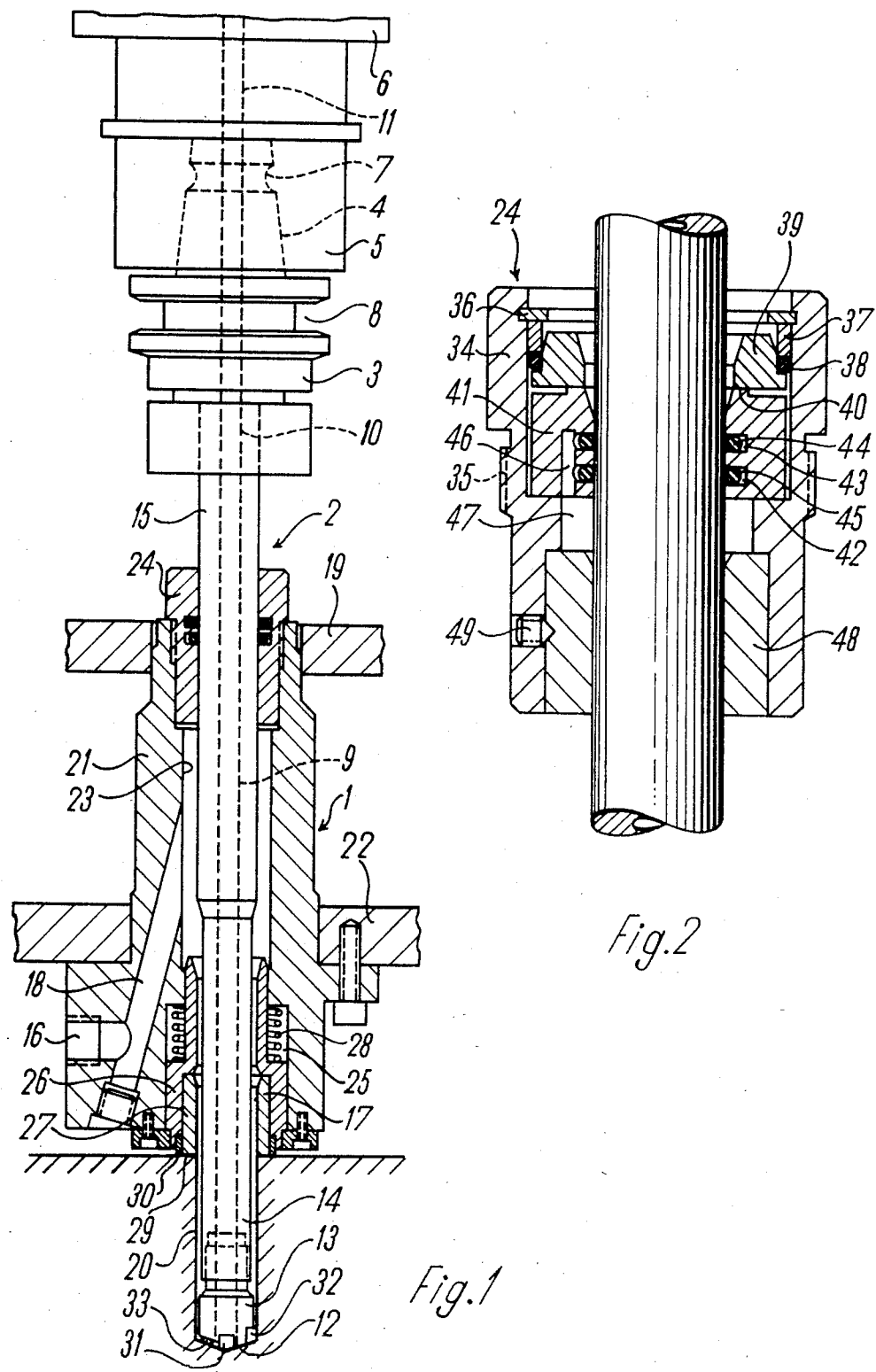
FIG. 1, shows a exemplary embodiment of the present invention where the BTA method is used.
FIG. 2, is a more detailed view of the stuffing box used in the embodiment of FIG. 1.

FIG. 1 shows a lubricating-oil supply device or LOSD 1 of a deep-drilling machine, with the tool 2 inserted. The LOSD includes a housing 21 which defines an interior 23. The tool 2 is firmly received in a tool holder 3, which has an insertion cone 4. With this insertion cone 4, the unit comprising the tool 2 and the tool holder 3 can be inserted into the receiving part 5 of a tool spindle 6. For locking purposes, the insertion cone 4 has a groove 7 around it that is engaged by claws (not shown) in the receiving part 5.

The unit comprising the tool 2 and the tool holder 3 can be changed if a gripping tool (not shown) engages the groove 8 and, after unlocking, pulls the tool holder 3 along with the tool 2 out of the receiving part 5. The same gripping tool can then pick up another tool from a magazine and insert it into the receiving part 5.

The tool 2 is a deep-drilling tool. During deep drilling, the tool tip is continuously cooled by supplying soluble cutting or lubricating oil to it; when the cooling lubricant is removed, the chips are simultaneously removed with it. In the BTA method, the path of the lubricating oil is as follows: The lubricating oil is supplied to the LOSD 1 via a connection 16 and a line 18 in the housing 21. From the interior 23 of the housing 21 of the LOSD 1 the lubrication oil enters the free space 17 between the tube section 14 and the hole or bore 20 being drilled. Its removal along with the chips generated during drilling is effected through a passage 9, which opens into the end face 12 of the drill head 13, as well as via the adjoining passages 10 and 11.

The housing 21 of the LOSD 1 is secured to a carrier plate 22, which is connected to the machine frame (not shown) and extends up into plate 19, which is also connected to the machine frame. The interior 23 is sealed off from the tool spindle 6 (at the top in FIG. 1) by a stuffing box 24 (shown in detail in FIG. 2), which seals off the outer circumference (in the drilling direction) of the rear tube section 15. The stuffing box 24 is threadly engaged with the end of the housing 21 received in the plate 19. In the drilling direction, that is, toward the bottom in FIG. 1, sealing is effected in that the drill bushing holder 26 disposed in the recess 25 is pressed with the sealing ring 30 and the drill bushing or guide sleeve 27 against the end face 29 of the bore 20 by means of a spring 28.

The special feature of the tool 2 is that it is embodied in two stages; that is, it comprises a front tube section 14 and a rear tube section 15. The outer diameter of the two sections is different. The diameter of the tube section 15 at the rear in the drilling direction is larger than that of the drill head 13 or of the bit 33 and the guide grooves 31, 32. The diameter of the rear tube section 15 is accordingly also larger than that of the tube section 14 toward the front in the drilling direction. It is thereby assured that when a tool change is performed the tool 2 can be pulled out toward the rear in the drilling direction (that is, toward the top in FIG. 1) through the entire LOSD 1. The outer diameter of the guide grooves 31, 32, however, remains equal to the inside diameter of the drill bushing 27. Because of the design selected here, the drill head 13 can thus also be moved all the way through the stuffing box 24 and out of the LOSD 1. This occurs when the tool spindle 6 moves upward with the receiving part 5 and the tool 2 for the purpose of changing the tool.

As a result of this two-stage embodiment, it is thus assured that during operation the stuffing box 24 forms a seal with respect to the rear tube section 15, while on the other hand the drill head 13, which has a smaller diameter than does the rear tube section 15, can be moved all the way through the stuffing box 24 when a tool change is performed. This can be accomplished only when the drill head 13 is located on the tube section 14 which in turn has a smaller diameter than that of the drill head 13. Thus this embodiment makes it possible, for the first time, to remove the entire tool from the LOSD for tool-changing purposes without requiring disassembly. It is accordingly also possible to change a tool in the receiving part 5 of the tool spindle 6 in a simple manner.

FIG. 2 shows the stuffing box 24. It comprises a bushing 34 with an external thread 35, which is threaded into the housing 21. A slip ring 39 is held in place by a Seeger ring 36 and a spacer sheath 37 and is sealed off by a sealing ring 38. Resting on the slip ring 39 in the axial direction is the slip shoulder 40 of a sealing ring 41. Two grooves 42 and 43 are provided in the sealing ring 41 in which O-rings 44 and 45 are disposed respectively. The grooves 42 and 43 communicate radially and on the outside with a lubricating-oil supply bore 46, which discharges at the bottom into the free, cylindrical interior space 47 of the bushing 34. A bearing box 48 is also disposed in the bushing 34 and is held in its position by a threaded pin 49. Through the gap between the tube section 15 and the bearing box 48, lubricating oil which is under pressure is forced from the space 23 into the interior space 47 and into the lubricating-oil supply bore 46. The lubricating oil under pressure thereby also acts within the groove 42 and 43 onto the O-rings 44 and 45 from the outside and presses them inward against the surface of the rear tube section 15.

With respect to the embodiment of the tube carrying the drill head 13 in the form of a two-stage deep-drilling tool having two tube sections, it must also be noted quite generally that the two tube sections 14,15 may for example be embodied such that they are produced in one piece with appropriately recessed external dimensions. However, it is also possible to fabricate the two sections separately and to screw them together or weld them to one another. Screwing them has the advantage that on the rear tube section, the front tube sections can be replaced so as to provide drill heads for various dimeters. It is also possible to provide a collet chuck on the end of the rear tube section, with the front tube section or in other words the tube section having the smaller diameter received in this collet chuck. The outer circumference of the collet chuck must not, in that case, be larger than the outer circumference of the rear tube section.

According to the preferred embodiment, the length of the front tube section 14 is at least equal to the length of the bore 20 and the length of the bushing holder 26.

What is claimed is:

1. A deep-drilling tool including a tube, a drill head and sealing means, said tube being axially movable within the sealing means and being embodied as a tube having a passage defined therethrough,
    said tube comprising: a front tube section having an outer surface defining an outer diameter; and a rear tube section joined to the front tube section, said rear tube section having an outer surface defining an outer diameter,
    said sealing means comprising: a bushing within which a slip ring and a sealing ring are mounted in the axial direction of the tube, said sealing ring having at least one radial groove and means for communicating a source of pressure to each radial groove; means for retaining said slip ring stationary with said bushing relative to said sealing ring and the tube; and an elastic O-ring mounted within each radial groove of said sealing ring, each O-ring being compressed against the outer surface of the rear tube section when pressure is applied to its radial groove and expandable into its radial groove away from said outer surface when the pressure is removed, wherein:
  (i) the drill head is attached to the front tube section;
  (ii) the drill head defines a diameter which is larger than the outer diameter of the front tube section and smaller than the outer diameter of the rear tube section; and
  (iii) the slip ring and sealing ring define engageable surfaces which effect a seal for the rear tube section.

2. The deep-drilling tool as defined in claim 1, further wherein:
  (iv) the rear tube section is releasably connected to the front tube section, such that the front tube section is replaceable with or without the drill head.

3. The deep-drilling tool as defined in claim 1, further including a further bushing through which the front tube section extends when drilling a bore, further wherein:
  (iv) the length of the front tube section is at least equal to the length of the bore to be drilled and the further bushing through which the front tube section extends when drilling a bore.

4. The deep-drilling tool as defined in claim 3, further wherein:
  (v) the rear tube section is releasably connected to the front tube section, such that the front tube section is replaceable with or without the drill head.

5. The deep-drilling tool as defined in claim 1, further wherein:
  (iv) a groove is provided on the outer circumference of the front tube section, said groove extending axially on said outer circumference and being provided for use in a single-lip drilling method for removing coolant and chips generated during drilling.

6. A lubricating-oil supply device for a deep-drilling machine including a spindle and a tool including a tube having a passage defined therethrough and a drill head attached at one end thereof,
  said tube comprising: a front tube section having an outer surface defining an outer diameter; and a rear tube section joined to the front tube section, said rear tube section having an outer surface defining an outer diameter,
  said supply device comprising: a housing defining an interior through which the tool extends, and a line through which lubricating oil passes into said interior; bushing means located at one end of said housing; spring means mounted within said housing and biasing said bushing means outwardly from said housing; and a stuffing box located at the other end of said housing,
  said stuffing box comprising: a bushing within which a slip ring and a sealing ring are mounted in the axial direction of the tube, said sealing ring having at least one radial groove and means for communicating each radial groove with said interior; means for retaining said slip ring stationary with said bushing relative to said sealing ring and the tube; and an elastic O-ring mounted within each radial groove of said sealing ring, each O-ring being compressed against the outer surface of the rear tube section when lubricating oil pressure is applied to its radial groove and expandible into its radial groove away from said outer surface when the lubricating oil pressure is removed, wherein:
  (i) the drill head is attached to the front tube section;
  (ii) the drill head defines a diameter which is larger than the outer diameter of the front tube section and smaller than the outer diameter of the rear tube section;
  (iii) said busing means serve to seal the housing interior from the outside; and
  (iv) the slip ring and sealing ring define engageable surfaces which serve to seal the housing interior from the tool spindle.

* * * * *